(12) United States Patent
Dean et al.

(10) Patent No.: US 9,489,451 B2
(45) Date of Patent: Nov. 8, 2016

(54) VISUAL DATA DEFINITION FOR IDENTIFYING DATA ITEMS IN LOOSELY-STRUCTURED DATA

(71) Applicant: Compuware Corporation, Detroit, MI (US)

(72) Inventors: Hesham Dean, Sterling Heights, MI (US); Andrew Lipin, West Bloomfield, MI (US); Gary Michalek, Northville, MI (US); Barbara Szydlowski, Windsor (CA)

(73) Assignee: Compuware Corporation, Detroit, MI (US)

( * ) Notice: Subject to any disclaimer, the term of this patent is extended or adjusted under 35 U.S.C. 154(b) by 488 days.

(21) Appl. No.: 13/910,468

(22) Filed: Jun. 5, 2013

(65) Prior Publication Data

US 2014/0365535 A1 Dec. 11, 2014

(51) Int. Cl.
*G06F 17/30* (2006.01)

(52) U.S. Cl.
CPC ............... *G06F 17/30675* (2013.01)

(58) Field of Classification Search
CPC .......... G06F 17/30321; G06F 17/212; G06F 17/30675
USPC ........ 707/802, 803, 805, 811; 715/243, 253; 704/9, 10
See application file for complete search history.

(56) References Cited

U.S. PATENT DOCUMENTS

| | | | | |
|---|---|---|---|---|
| 7,093,233 | B1* | 8/2006 | Subramanya | G06F 17/30943 717/123 |
| 2003/0167276 | A1* | 9/2003 | Simpson | G06F 17/30864 707/999.102 |
| 2008/0040345 | A1* | 2/2008 | Cameron | G06F 7/02 707/999.1 |
| 2012/0233037 | A1* | 9/2012 | Lamoureux | G06Q 30/02 705/27.2 |
| 2012/0239426 | A1* | 9/2012 | Durgin | G06F 17/30292 705/3 |

* cited by examiner

*Primary Examiner* — Hares Jami
(74) *Attorney, Agent, or Firm* — Harness, Dickey & Pierce, P.L.C.

(57) ABSTRACT

A computer-implemented method is provided for identifying items in loosely-structured data. The method generally includes constructing a composite data definition for items which are to be identified and parsing input data using the data definition. The composite data definition is constructed by defining a layout for a composite data definition, where the layout indicates at least one of positional relationship of data items to each other and positional information for data items in the loosely-structured data; arranging data items in the layout, where each data item in the layout has a common meaning for applications that use the data item; creating an identification order list for the composite data definition, where the identification order list includes the data items in the layout and specifies an order in which the data items comprising the composite data definition are to be identified within the loosely-structured data.

28 Claims, 7 Drawing Sheets

VISUAL DATA DEFINITION FOR IDENTIFYING DATA ITEMS IN LOOSELY-STRUCTURED DATA

FIELD

The present disclosure relates to a visual data definition and associated methods for identifying data items in loosely-structured data.

BACKGROUND

Modern software applications typically operate with data stored in well-structured form, such as normalized relational databases, delimited or XML files. Often-times business applications have to interact with loosely-structured data, in which identification of particular parts depends on other parts and some other conditions. Examples of such data include: full names, that can include first, middle and last name(s), title(s), suffix(es), last name prefix(es), etc.; mailing addresses, that can include cities, states, zip codes, street addresses, PO Boxes, apartment numbers, etc.; and Internet URLs, that can include protocol, domain name, IP address, page relative path, page name, parameters, etc.

In order to process and maintain such data, computer programs have to be able to identify particular items in such loosely-structured data. For example, when sampling of data is created for testing, all sensitive data including real names and addresses are typically required to be replaced with fictitious values. While identification of the items within some kinds of well-structured data may be trivial, it can become very complicated when the analysis involves many optional data items with complex ordering and separation rules.

The approach most commonly used for finding data subsets matching given patterns is based on the Regular Expressions. Regular Expressions (or Regex) has been a standard in computer science since 1960s as a formal language that is capable of describing pretty complex matching rules, and its multiple implementations are widely used in the industry.

While Regex is extremely powerful and efficient for identification of a single data subset, it is very limited in defining non-trivial relationships between multiple data items. The only method available is based on lookarounds (lookaheads and lookbehinds), which are extensions of the Regex standard and supported by several implementations. When Regex with lookarounds is used for parsing—for example—a mailing address, in which most of the items are optional and the order can vary, the corresponding regular expressions becomes very long and hardly maintainable. Many of these expressions would contain identical or almost identical pieces corresponding to the same data items, with no suitable way to avoid duplication or to keep them in sync. Writing or modifying of such regular expressions becomes fairly complicated, and the processing efficiency is poor.

Another approach that can be used to address the problem is to associate every composite data structure with an executable module or procedure that provides parsing logic and returns the identified parts. This is an extremely powerful approach, since it can provide a custom implementation that is most suitable and most efficient for every composite type. For example, it can use Regex or other techniques for identification of particular data parts, while the program keeps track of the logical dependencies and already identified items. The primary limitations of this approach are the development cost associated with support of a new composite type and the high cost of maintaining it and making modifications to the program.

Therefore, it is desirable to develop improved methods for identifying data items in loosely-structured data. This section provides background information related to the present disclosure which is not necessarily prior art.

SUMMARY

This section provides a general summary of the disclosure, and is not a comprehensive disclosure of its full scope or all of its features.

A computer-implemented method is provided for identifying items in loosely-structured data. The method generally includes constructing a composite data definition for items which are to be identified and parsing input data using the data definition. The composite data definition is constructed by defining a layout for a composite data definition, where the layout indicates at least one of positional relationship of data items to each other and positional information for data items in the loosely-structured data; arranging data items in the layout, where each data item in the layout has a common meaning for applications that use the data item; creating an identification order list for the composite data definition, where the identification order list includes the data items in the layout and specifies an order in which the data items comprising the composite data definition are to be identified within the loosely-structured data.

In one aspect of this disclosure, a visual editor is provided for constructing and editing a composite data definition. The visual editor includes: a data item panel configured to display a listing of data items, where each data item in the listing of data items has a common meaning for applications that use a data item and include one or more properties associated therewith; a composite definition layout panel providing a layout field configured to receive one or more data items from the listing of data items, where placement of a given data item in the layout field correlates to position of the given data item in loosely-structured data; an identification order panel configured to display data items placed in the composite definition layout, where the displayed data items are in an order in which the data items are to be identified by a parsing method in the loosely-structured data; and a properties panel configured to display properties associated with a selected object on the visual editor, where the visual editor is implemented by computer-executable instructions executed by a computer processor.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 provides an overview of defining a composite data definition and using the definition to identify items in loosely-structured data;

Corresponding reference numerals indicate corresponding parts throughout the several views of the drawings.

DETAILED DESCRIPTION

Figure 1:
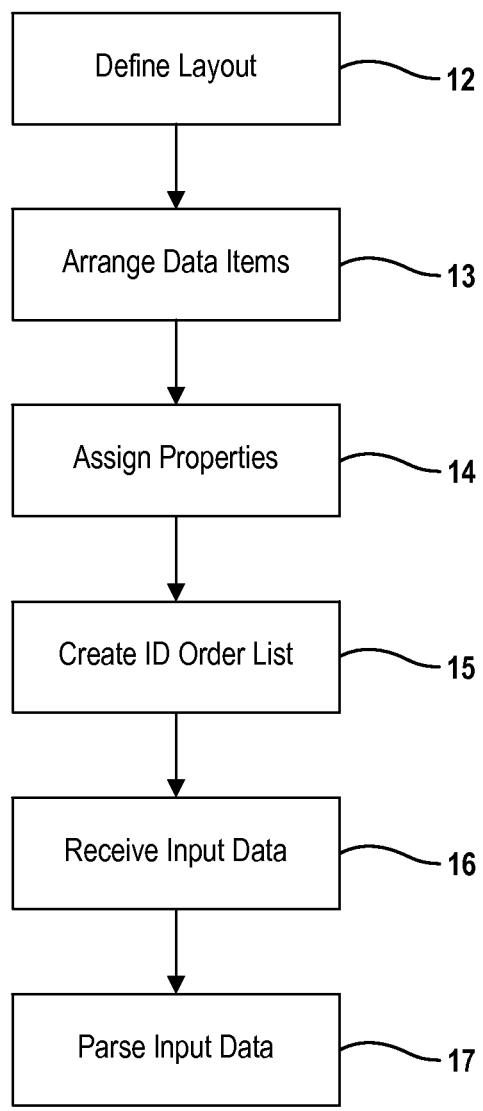

Example embodiments will now be described more fully with reference to the accompanying drawings.

Composite data is used to denote data that contains a set of fragments that have independent meaning. These fragments may or may not be linked together with other fragments by certain relationships between themselves or towards the whole body of loosely-structured data, such as to be left or right neighbor, to precede or follow, to be mutually exclusive, or to have the left or right boundary at a specified position within the data. The fragments are referred to herein as composite parts. In a simple example, the composite data is a fixed structure in which the length and position of each composite part are known, thereby making identification of the particular composite parts trivial.

More complex examples may include but are not limited to chains, simple scans or chained scans. In a chain, multiple composite parts are linked together in certain order and the beginning and/or end of the chain are known, such as a 'full name' or 'full address'. In a simple scan, fragments are not linked with others, but may be present in the composite data, such as phone numbers that may be present in free-form text. In a chained scan, single or multiple chains of fragments may be present within the composite data; fragments include, for example, scanning for full addresses that are comprised of street addresses, cities, states, postal codes, separators, etc.; keyword-based scanning, in which one or more composite parts follow certain keywords; scanning for certain combinations of nodes in XML data, etc. This disclosure provides an innovative method for defining a composite data definition, a visual facility for viewing and editing such composite data definitions, and an algorithm that provides efficient parsing and identification of individual composite parts in accordance with a composite data definition.

In this disclosure, a composite data definition represents the data to be identified in loosely-structured data. In an example embodiment, the composite data definition is comprised of a collection of composite definition layouts supplemented with an identification order list. The composite data definition is used by a identification method to identify data items found in loosely-structured data as will be further described below.

Data items are the basic building blocks for a composite data definition. Data items are logical units of data that have a common meaning for the applications that work with the data. Examples of data items include middle name, zip code, social security number, comma, whitespace separators, etc. Thus, data items are universal entities that can be shared by different composite data definitions.

Each data item is assigned a name. Data items can also be assigned other attributes. Example attributes for data items includes length of a data item, minimum length of a data item, maximum length of a data item, list of values for a data item (e.g., a data item for a state or country could include an enumeration of valid states or countries), pattern of characters which comprise a data item, case-sensitivity of characters which comprise a data item, and a reference to a composite definition layout. Other types of attributes are contemplated by this disclosure.

Delimiters or separators are a special type of data item. When constructing a composite data definition, delimiters are used to delineate between other data items. Example delimiters include but are not limit to commas, colons, white spaces, etc. Delimiters may be handled in a different manner by the identification method.

To construct a composite data definition, data items are arranged in a composite definition layout. Once the data item is associated with a composite definition layout, a data item is referred to as a composite part. That is, a composite part is a particular occurrence of a data item in a composite definition layout. In some instances, data items arranged in a composite definition layout are selected from a predefined listing of data items. In other instances, data items can be constructed and/or customized by a system operator before being arranged in a composite definition layout.

The composite definition layout captures positional information for the composite parts associated therewith. For example, positional information can specify that composite parts are neighboring, have a preceding or following relationship, or are a fixed or relative offset from another composite part. Additionally or alternatively, positional information can specify a fixed offset for the composite parts in relation to a beginning or end of the loosely-structured data. In other words, the composite definition layout indicates at least one of a positional relationship of composite parts to each other or positional information for composite parts within the loosely-structured data.

In addition to the core attributes associated with a data item, identification properties can be assigned to composite parts in a composite data definition. For example, composite parts can be specified as being an optional part of the composite data definition. In another example, composite parts can be specified as having multiple occurrences in the composite data definition. Other types of identification properties are further described below. Such properties are assigned to a given composite part by a system operator after the given composite part has been arranged in a composite definition layout. Identification properties are also used by the identification method to identify the composite part in the loosely-structured data.

Search direction is an identification property that indicates a direction to search for the composite part in the loosely-structured data. Composite parts can be search for in a left-to-right direction or a right-to-left direction. A default value may be assigned to the search direction in accordance with the placement of a composite part in the layout. For example, a composite part placed at a left most position within the layout can be defaulted to a left-to-right search direction; whereas, a composite part placed at a right most position in the layout can be defaulted to a right-to-left search direction.

Location method is an example identification property. The location method specifies a method by which to locate a given composite part in the loosely-structured data. Example methods include locating by a regular expression pattern, by a list of values, by length, by exact position, by relative position, and by a delimiter, which is defined as another composite part specified as a left or right neighbor of the given composite part in its layout. A system operator may be presented with one or more of these location methods depending on the other attributes associated with the underlying data item. For example, a composite definition for processing of US State and Zip-code can be comprised of three parts—'State', 'Whitespace Separator' and 'Zip-Code'. If the data always contains only the concise 5-digit representation of Zip-code, the Location method can be defined as 'By Length', which—in combination with the 'Right-to-left' Search Direction property would allow fast and efficient identification of the 'Zip-code' part. If the data may contain a long form of Zip-code, such as '12345-6789', then the Location Method can be set to 'By Delimiter' to specify that the preceding 'Whitespace Separator' should be located first and it would be used to define the boundary of the 'Zip-Code' part. And if the data can contain extra white spaces within the 'Zip-code' part, such as '12345-6789', the Location Method can be set to 'By Regular Expression Pattern' and the pattern can be defined as "\d{5}(\s*-\s*\d{4})?", in which case the Zip-code part would be found by matching this pattern.

Validation method is another example identification property. The validation method specifies a method by which to validate a value of the composite part. Example methods include validating by a regular expression pattern, by a list of values, by length, by position, etc. Data in the loosely-structured data must pass the validation method to be considered as a match.

In a similar manner, a logical condition can be used as an identification property. A logical condition specifies a condition by which to identify a composite part. An example condition is that a separator can only be identified when the neighboring composite part has been found. Data in the loosely-structured data must pass the logical condition to be attempted to be identified.

Composite parts may also be designated as either a prefix or a suffix. In the case when a given composite part is identified as a prefix or a suffix, the given composite part is associated with the composite part that follows or precedes the given composite part, respectively. Any separators found between the prefix or suffix and the associated part is also associated therewith. Other types of identification properties also fall within the scope of this disclosure.

The composite part definition further includes an identification order list. The identification order list is comprised of the composite parts in the layout and specifies an order in which the composite parts are to be identified in the loosely-structured data. Use of the identification order list by the identification method is further described below.

FIG. 1 provides an overview of defining a composite data definition and using the definition to identify items in loosely-structured data. A definition layout is used at 12 to guide the construction of a composite data definition, where the layout indicates at least one of positional relationship of data items to each other or to the containing loosely-structured data, and positional information for data items in the loosely-structured data.

Data items are then arranged at 13 in the layout, where each data item in the layout has a common meaning for applications that use the data item. Identification properties can optionally be assigned at 14 to the data items placed in the layout. An identification order list for the composite data definition is also created at 15, where the identification order list includes the data items in the layout and specifies an order in which the data items comprising the composite data definition are to be identified within the loosely-structured data. Upon receiving input data at 16, the input data can be parsed at 17 to identify data items therein using the layout and the identification order list of the composite data definition.

To help better understand the composite data definition, an example of identifying a full name of a person is set forth and described throughout this disclosure. The name of a person may include a title, first name, middle name, last name, suffix, etc. Accordingly, data items are defined to identify each possible part of a person's name. Example data items for identifying a name, along with attributes and properties, are set forth in the appendix below. The data items are then used to construct a composite data definition for a person's full name entitled 'Full Name'. For example, the composite definition layout for 'Full Name' can include data items sequenced as follows: Title; White Space Separator; First Name; White Space Separator; Middle Name; White Space Separator; Last Name Prefix; White Space Separator; Last Name; White Space with Optional Comma Separator; Suffix. In addition, the identification order list is as follows: Title; White Space Separator; First Name; White Space Separator; Suffix; White Space with Optional Comma Separator; Last Name; White Space Separator; Last Name Prefix; White Space Separator; Middle Name. It is understood that the construct for data items, id order list, and the composite data definition may vary and are provided for illustration purposes.

Figure 2:
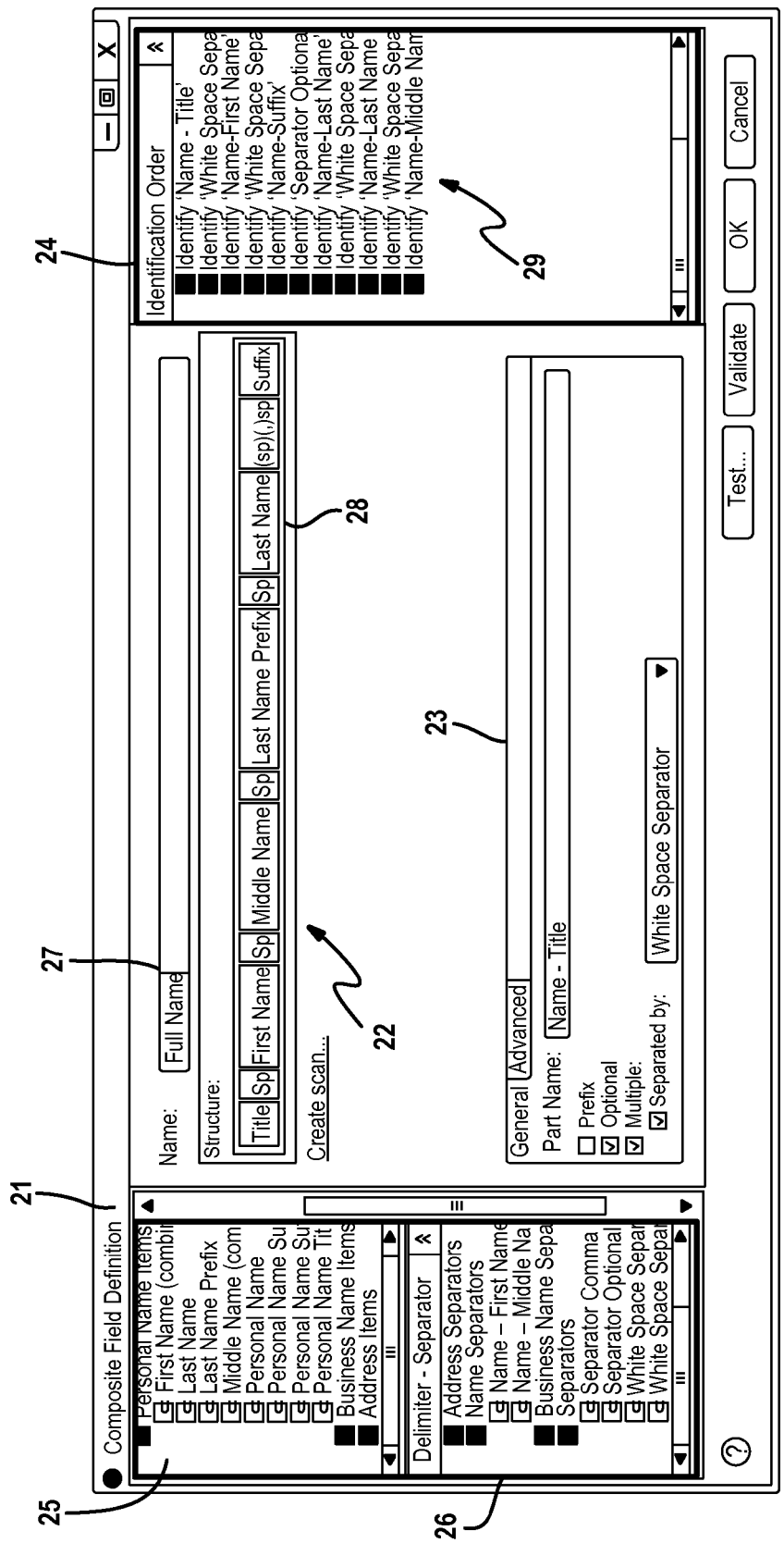
FIG. 2 depicts an example embodiment of a graphical user interface for the visual editor.

Continuing with the example, a composite field definition is constructed for parsing a full name. In one aspect of this disclosure, a visual editor is provided for constructing and editing composite data definitions. FIG. 2 depicts an example embodiment of a graphical user interface 20 for the visual editor. The graphical user interface is comprised generally of a data item panel 21, a composite definition layout panel 22, a properties panel 23 and an identification order panel 24.

The data item panel 21 provides visual access to a listing of available data item definitions. Data items may be grouped based on types, tags or categories. For example, data items pertaining to names may be grouped under a heading called 'name' and data items pertaining to addresses may be grouped under a heading called 'address'. In the example embodiment, the panel is subdivided into a first listing 25 and a second listing 26, where the second listing 26 include delimiter type data items. It is understood that delimiters is merely a special type of data item and thus could be integrated into the first listing. The data item panel may further include functions for filtering and/or sorting the data items in the listings.

The composite definition layout panel 22 provides an intuitive graphical representation of the composite definition layout. Each composite definition layout panel includes a name for the layout as indicated at 27. The composite definition layout can be visualized, for example, in a form of a horizontal bar or a horizontal line as indicated at 28. Composite parts arranged in the layout can be highlighted and marked based on its associated properties. For example, composite parts designated as optional can be visually distinguishable, for example using semi-transparent fill color or by using a dotted border line. Visualization of neighboring relationships can be shown in the form of connected segments. Bold border lines can be used to mark the fixed positions of the beginning or end of composite parts. Special markings may also be used for other supported attributes, such as 'Multiple', 'Search Direction', 'Find All', etc.

In the example embodiment, the composite definition layout panel 22 supports the drag-and-drop operations for inserting data item definitions into the layouts by picking them from the data items panel 21. When a new data item definition is added to the layout, its drop-position can be used to initialize its properties in the most intuitive way. For example, when the item is released when touching or nearly touching another composite part or the structure layout border, a neighboring relationship between these parts is created and it will be used to initialize the 'Search Direction' and other attributes of the new part. The composite definition layout panel 22 can also offer intuitive editing facilities by allowing movement or positioning of composite part definitions within the same layout or between different layouts, as well as reordering of the layouts and removal of composite part definitions from the layout.

The properties panel 23 denotes the area that displays the properties of currently selected object and provides a means for editing such properties. The properties panel achieves better usability by grouping different types of properties together. For example, properties for composite parts can be grouped into three groups: general, location/validation and conditions. It is understood that other groupings are contemplated by this disclosure.

Content of the properties panel is context driven. Depending on which visual element is selected in one of the other panels, the properties panel 23 can display its properties or provide editing facilities for its instant configuration. For example, when a data item is selected in the data items panel 21, the properties panel 23 can display the attributes of that data item, such as length, maximum or minimum length, regular expression patterns, list of values, etc. When a composite part or a layout is selected in the composite definition layout panel 22, the properties panel 23 can display and allow editing of its properties, such as part's position within the layout, search direction, prefix/suffix attributes, etc. When an entry from the identification order panel 24 is selected, the properties panel 23 can display and allow modification of the identification-related properties of the selected entry, such as location direction, location and validation methods, etc.

The identification order panel 24 is the area that visualizes the order in which different composite parts or layouts are supposed to be processed by the identification method. In one embodiment, a tree is used to represent the identification order as indicated at 29. The identification order would be populated each time a new composite part or composite layout is added to a composite data definition. Similar to the composite definition layout panel, special styling and marking can be used in the identification order panel to achieve better visualization. For example, the identification order panel can display the Search Direction for data part definitions, and show optional items and highlight separators/delimiters using different styles.

Special logic can be applied to make the order of composite parts more intuitive. For example, when a new composite part is added to follow or precede another part or parts in the composite definition layout, this new part would be placed immediately after the part(s) it's related to in the identification order. Any new Scan Layouts can be placed at the end of the list as a new tree branch which would contain all Composite Part Definitions that would be parts of this Scan Layout. The identification order panel provides editing facilities for reordering of items in the list, such as drag-and-drop operations, up/down button or other means. While a reference is made to a particular user interface, it is understood that variants to the interface also fall within the broader aspects of this disclosure.

The composite data definition described above is designed to be a generic and flexible concept. Its structural elements, such as Composite Layouts and Part Definitions, can have different sets of properties and the Identification Order List can require any particular order of parsing, including one different from the order of the Part Definitions within corresponding Composite Layouts. Consequently, finding of all parts defined by a composite data definition in loosely-structured input data can be quite sophisticated.

FIGS. 3-7 depict an example method for locating composite parts using a composite data definition in an abstract, efficient and extensible way. The identification method is comprised generally of two separate stages: a compilation stage and a parsing stage. When the same composite data definition is repeatedly used for parsing of multiple sets of data, the compilation process occurs only once and it is aimed to prepare a processing framework capable of parsing multiple data sets efficiently. While a particular identification method is presented below, it is understood that other types of identification methods can be used with the composite data definition described above.

Terminology and concepts pertaining to the identification method are set forth before describing the steps of the method. 'Part Processors' represent the logical units aimed to identify a particular composite part definition. 'Identified Part' represents the location of a single instance of a composite part that has been identified during parsing. 'Composite Identified Parts Registry' represents the collection of Identified Parts and provides an efficient way of keeping track of non-identified areas, checking whether a particular data segment lies in the non-identified area, adding new Identified Parts and ordering all Identified Parts based on their positions in the data being parsed.

'Domain' represents a subset of the data being parsed in which a particular composite part can be located. Domains can consist of a single data segment (called 'Simple Domain') or of a group of data segments (called 'Complex Domain'). One or both sides of the domain are called 'Pinned' when the composite part being identified start and/or end at the corresponding position. For example, the right side would be pinned when the part has a right neighboring composite part in the layout and that neighboring part has already been identified. 'Composite Processor' represents a logical unit capable of parsing data for a particular composite data definition and optimized for such parsing.

'Boundaries' represents a logical unit capable of efficient creation and/or initialization of Domains for a particular composite part definition. In order to achieve it, boundaries can, for example, classify all Part Definitions that are supposed to be processed earlier based on their place in the Layout, such as 'precede', 'follow', 'must touch', 'can touch', etc. Boundaries can be represented as a set of the Left and the Right Boundaries; each of which is keeping track of the related Part Definitions in one direction, left-to-right, or right-to-left, and then each of these two Boundaries can be used to determine one side of the Domain.

'Locator' represents a logical unit capable of finding a Composite Part within a Domain using a particular supported Locator Type. Examples of Locators include 'Locator by Regular Expression Pattern', 'Locator by Values List', 'Locator by Length', 'Locator by Delimiter'. Similarly, 'Validator' represents a logical unit capable of verifying whether the located Composite Part matches a particular supported Validation Type. Examples of Validators include 'Validator by Regular Expression Pattern', 'Validator by Values List', and 'Validator by Length'.

'Discoverer' represents a logical unit aimed to identify one or more logically grouped Composite Parts. When there are multiple Composite Parts associated with a Discoverer, the Discoverers associated with them are called 'Dependent Discoverers', while the compound Discoverer is called their Owner. Examples of the Discoverers can include 'Single Part Discoverer', 'Discoverer by Delimiter', 'Multiple Part Discoverer', 'Multiple Part Discoverer by Delimiter', 'Scan Discoverer', etc. Attributes and properties defined for the Discoverers are as follows. 'Simple Discoverer' is a Discoverer with no Dependent Discoverers; they can be used for identification of a single independent Composite Part Definition. 'Complex Discoverer' is a Discoverer that has Dependent Discoverers. 'Optional Discoverer' is a Discoverer which is not required to succeed in identification of all associated Composite Parts. 'Tenant Discoverer' is a Discoverer that is not required to define its Domain; the Domain can be provided by its Owner Discoverer. 'Landlord Discoverer' is a Discoverer that is responsible for defining the Domain for its Tenant Dependent Discoverers. 'Virtual Discoverers' are the Discoverers that are not directly linked to a particular Part Definition; they can be used for grouping of their Dependent Discoverers and other purposes. 'Condition' is an inherited Identification Condition of the corresponding Composite Part Definition (for a non-Virtual Discoverer) or an inherited Processing Condition of the Composite Layout for Discoverers associated with a Scan or Structure Layout, if it has such a Condition defined.

'Discoverer Identified Parts Registry' represents the collection of Composite Parts that have already been identified during the execution provided by a particular Complex Discoverer. It is used to keep track of the Identified Items during discovery, so when the discovery is successfully completed, it can report the Identified Parts to the Owner Discoverer when one exists, commit them into the Composite Identified Parts Registry when not, or discard them if execution fails.

Figure 3:
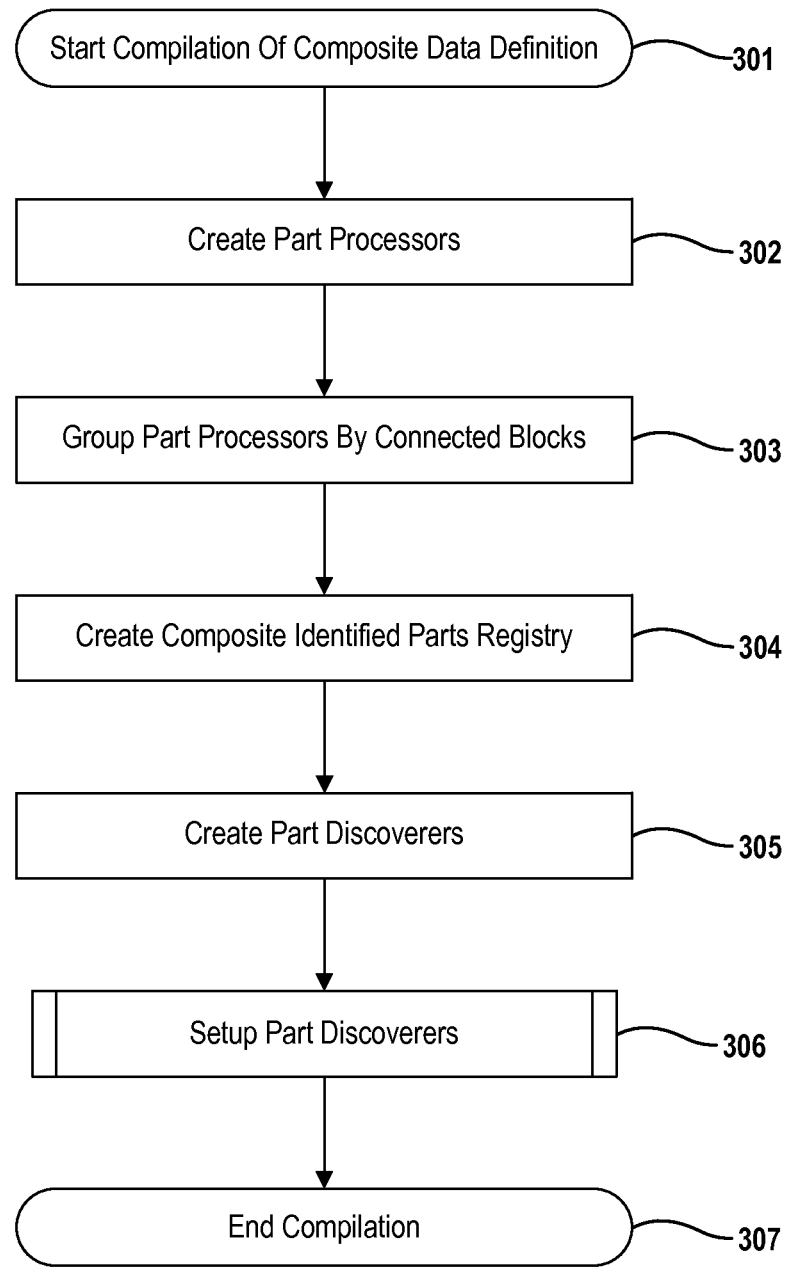
FIG. 3 is a flowchart depicting a compilation stage of an example identification method which uses the composite data definition.

With reference to FIG. 3, the compilation process starts at 301 with a given composite data definition. A Part Processor is created at 302 for each item from the Identification Order List and then associated with the corresponding Composite Part Definition. By analyzing composite definition layouts, Part Processors are grouped at 303 based on their belonging to a continuous connected block of neighboring Part Definitions. The Composite Identified Parts Registry is created at 304.

Part Discoverers are then created at 305 by analyzing dependencies between Composite Part Definitions. Types of the Discoverers can be assigned based on the Location Type of the corresponding Part Definition, as well as Location Types of the dependent Part Definitions. For example, for a Part Definition that has a 'Multiple' attribute with a specified Multiple Separator and with Location Type set to 'Locate by Delimiter', a special Discoverer logic (say—Delimited Multiple Part Discoverer) can be provided, which can use two other Complex Discoverers, one—'Delimited Part Discoverer', capable of discovering a Composite Part with one or more Delimiter Parts, and second—'Separated Part Discoverer' capable of discovering a Composite Part that follows the Multiple Separator Data Item. Each of those Dependent Discoverers could also embed other Discoverers, in this example—two or more Simple Discoverers. Another important example is Scan Discoverer, which can own Discoverers for all Composite Part Definitions included in a Scan Layout. Some of these Dependent Discoverers can also be complex, based on their Location Type and other properties; they can include Delimited Part Discoverers, Multiple Part Discoverers, and others.

Figure 4:
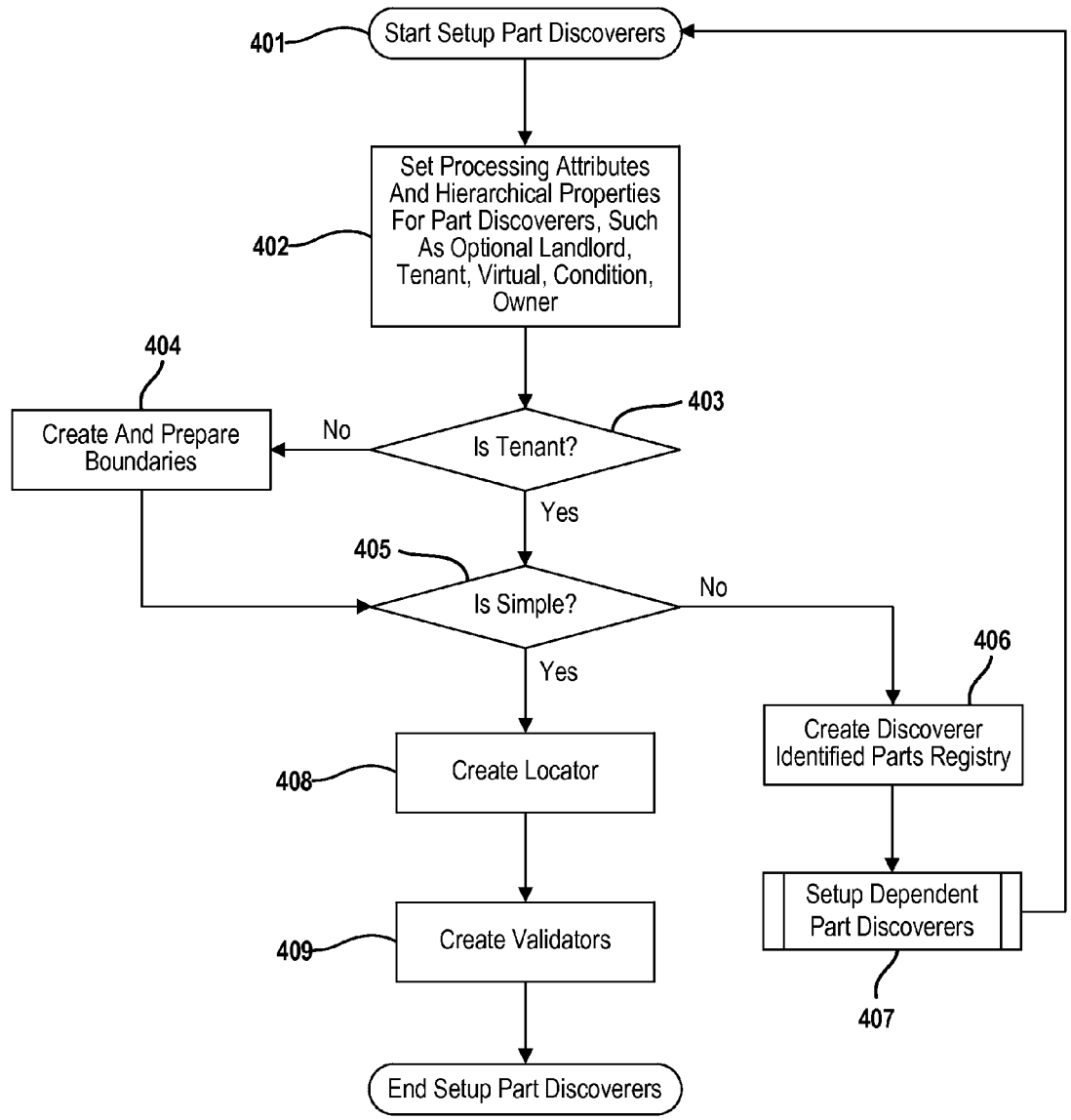
FIG. 4 is a flowchart depicting a setup procedure for part discoverers employed in the identification method.

Following the order defined by the Identification Order List, each Part Discoverer is setup as described in relation to FIG. 4. Input to this sub-process is the composite data definition and one Discoverer. Attributes and properties for the Discoverer, such as Optional, Landlord, Tenant, Virtual, Owner, Condition, etc., are set at 402. For a non-Tenant Discoverer, Boundaries are created and prepared at 404 as defined in the terminology section above.

When a Part Discoverer is being set up, it can happen that it depends on other Composite Part Definitions that appear later in the Identification Order List. As an example, the 'Delimited Part Discoverer' would have to identify the Delimiter Part before the primary part for this Discoverer, even if it stands below in the Identification Order List. In these cases, the Part Discoverers can take ownership over these other parts and can implicitly alter their position in the declared Identification Order.

For a non-Tenant Discoverer, Boundaries are created and prepared at 404 as defined in the terminology section above. This step involves analysis of the Composite Part Definitions that are supposed to be identified prior to Part Definitions associated with the current Discoverer, and evaluating them based on their positional relationship in the corresponding Composite Layout, aiming to minimize the amount of processing necessary to identify the Domain for the non-Tenant Discoverer. One possible approach for preparation of the Boundary is to keep track of Composite Part Definitions to be processed before the current Discoverer, and organize them into several ordered lists, such as the Guaranteed Neighbors List, which tells that the first member of this list that has already been found must be the neighbor of the current part, or Limits List, which tells that the first item from the list that has already been found must be in certain direction from the current part, or Belonging-To-Same-Continuous-Block List, which tells that the first member of this list that has already been found cannot be separated from the current part by any other identified parts that don't belong to the same continuous group. As an example, let's consider a Composite Definition which contains one Structure Layout with one block of four connected parts A, B, C, D and another block of two connected parts M, N, and assume that the Identification Order List includes them in the following sequence: N, M, A, D, C, B, and that the parts A, B, C, D, M are optional. In this case, the right Boundary for the part C can be built in the following way: the Guaranteed Neighbors List will contain D, the Limits List will contain M and N, and the Belonging-To-The-Same-Continuous-Block List will contain D. The right Boundary for it can be created as follows: the Guaranteed Neighbors List will be empty, the Limits List will contain A, and the Belonging-To-The-Same-Continuous-Block List will contain A. When this Boundary is requested to determine the domain for the part C, and only the parts A and N have been found prior to this step, the Domain can be initialized as an interval between the right side of A and left side of N, both not pinned. If the parts A, D and N have been found, than since the part D belongs to the Guaranteed Neighbors List, the domain right side would be left side of D, and it would be pinned.

For a Complex Discoverer, its private Discoverer Identified Parts Registry is created at 406. For a Complex Discoverer, all of its Dependent Discoverers are setup as indicated at 407 by repeating the Discoverer Setup for each Dependent Discoverer.

For a Simple Discoverer, a Locator logical unit is created at 408 based on the Location Type of the corresponding Composite Part Definition. Examples of Locators are given in the terminology section above. In addition, a collection of Validator logical units are created at 409 based on the Validation Methods selected for the corresponding Composite Part Definition. Examples of Validators are also given in the terminology section above. As a result of this sub-process, the input Discoverer is prepared for execution.

The discoverer setup process is further understood from the example scenario as follows. Assume that a composite definition contains one structure layout with sequential connected parts A, B, C, D, E, F and one scan layout with three connected parts S1, S2, S3. Also assume that all parts are searched in the left-to-right direction, that parts B, C, D, F, S2 and S3 are delimiters, that parts A, B, C, S1 are defined to be located by delimiters, parts D and F—by pattern, parts E, S2—by lists of values, and S3—by length. At last, assume the part S1 is defined as "multiple" with a separating part SS, and that the identification order is defined as follows: A, D, S1, S3, S2, B, C, F, E.

Creation of the "Discoverers Tree" involves iterating over the identification order list, and if that item is not owned by any discoverer, establishing a proper discoverer for it. Analyzing the first part A and finding that it is supposed to be located by a delimiter, and knowing from the layout that its delimiter in the left-to-right search direction is B, the discoverers building process decides that it should use the Delimited Part Discoverer dA, which is supposed to be responsible for location of both A and B. The discoverer dA will create a simple child discoverer for the part A, say sdA. Since B is also located by a delimiter, the discoverer dA can create another Delimited Part Discoverer dB, which will create its own simple child discoverer sdB and, since C is also located by delimiter, it will also create one more Delimited Part Discoverer dC with two simple child discoverers sdC and sdD. Therefore, the discoverer dA will become an ancestor for four simple discoverers, sdA, sdB, sdC, and sdD. This sequence didn't continue after part D, since it's located by a pattern and it doesn't depend on other parts.

Continuing to the next part D, the discoverers building process observes that it's already owned by a discoverer and continues to the following part S1. Since this part belongs to a scan layout, it creates a Scan Discoverer dS1. Further analyzing S1's attributes, it concludes that it can have multiple instances and needs to be located by a delimiter. Therefore it creates a Delimited Multiple Part Discoverer ddS1 and makes it a child of dS1. Furthermore, the discoverer ddS1 can create two child discoverers—Part-with-Following-Separator Discoverer ddSS and a Delimited Part Discoverer dddS1. The discoverer ddSS would be creating two simple child discoverers sdSS and sdS1 and the discoverer dddS1 can also have two simple children a copy of sdS1 and the discoverer sdS2 for the delimiter part S2. In the end, the scan discoverer ds1 will have to take ownership of all other parts that belong to this scan layout, so it will add a simple child discoverer sdS3 for the part S3.

After that the process will iterate over the remaining items from the identification order list, and it will create two more simple discoverers, sdF for the part F and sdE for the part E. In the end of this process, a tree of discoverers is created, and their attributes are assigned based on the properties of the corresponding parts and the internal logic of these discoverers. Based on the order in which the discoverers are ordering its children, the original identification order list will be adjusted to the following order: D, C, B, A, S2 (with SS), S1, S3, F, E.

Note that the libraries of delimiters can be created in many ways; some may be easier to maintain, some may be performing better. For example, instead of creation of several levels of embedded delimited part discoverers for A, B, C, D, the process could create a single Delimited Discoverer that is capable of handling several sequential delimiters at once. It can provide some performance benefits, though making the logic of the delimited discoverer more complex. Additionally, there are many ways how discoverers can be constructed. For example, they can be created dynamically each time based on templates or can be associated with items from pre-defined libraries. It doesn't matter much which implementation is selected; the important part is that (1) the internal logic of these discoverers is pre-defined, (2) that more complex discoverers are built out of simpler ones, (3) that discoverers are organized in a tree based on the parent-child relationship, (4) that some discoverers define their domains themselves (like scan discoverer dS1) and some receive it from the parent (like dB and sdA can get it from the landlord discoverer dA), (5) that some of the discoverers maintain a registry of identified items, and report it to the parent or clear it based on the result of discovery.

Once each Part Discoverer has been setup, the compilation stage is completed as indicated at 307 of FIG. 3. The result of the compilation stage is a Composite Processor that contains the ordered list of Discoverers, the Composite Identified Part Registry and mapping of Composite Parts Definition to corresponding Composite Part Processors.

Figure 5:
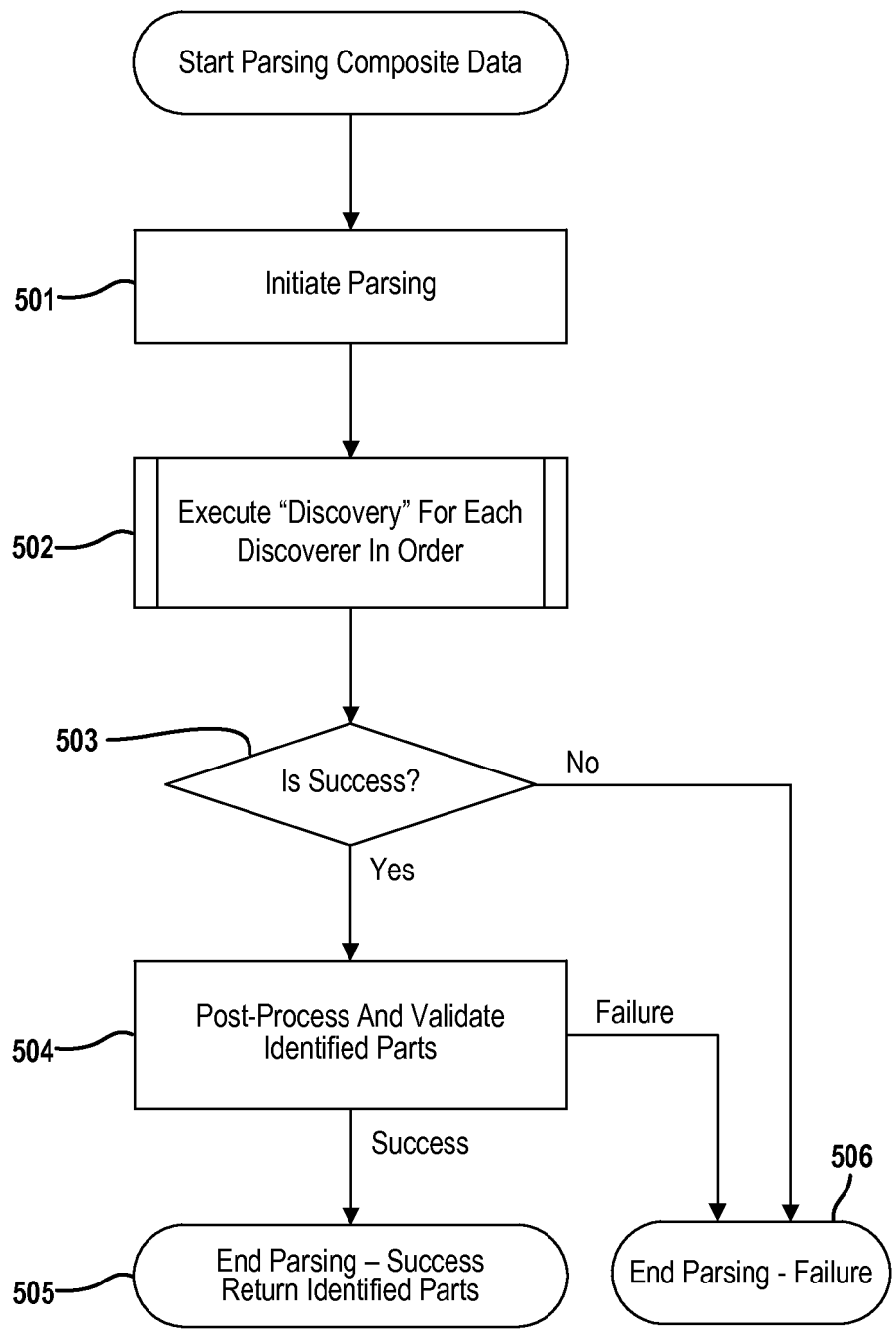
FIG. 5 is a flowchart depicting a parsing stage of the identification method.

With reference to FIG. 5, the Composite Processor, along with the input data to be parsed, serves as input to the parsing stage. All logical units within the Composite Processor that participate in parsing are first initialized at 501. For example, clear/prepare the Composite Identified Parts Registry and all Discoverer Identified Parts Registries. From the ordered list of Discoverers, a discovery sub-process is executed at 502 for each Discoverer in the list. The discovery sub-process is further described below in relation to FIG. 6. If each Discoverer in the list is processed successfully, then Identified Parts are post processed and validated at 505; otherwise, parsing is terminated at 506. Post-processing can involve joining some Identified Parts together based on the 'Prefix' and 'Suffix' attributes of the corresponding Composite Part Definition. Validation can include—for example—verification that the Identified Parts that belong to a continuous connected block of neighboring Part Definitions (based on the classification prepared in item 3) are not separated by non-identified area. Lastly, parsing concludes by returning the Identified Parts to the Composite Identified Parts Registry.

Figure 6:
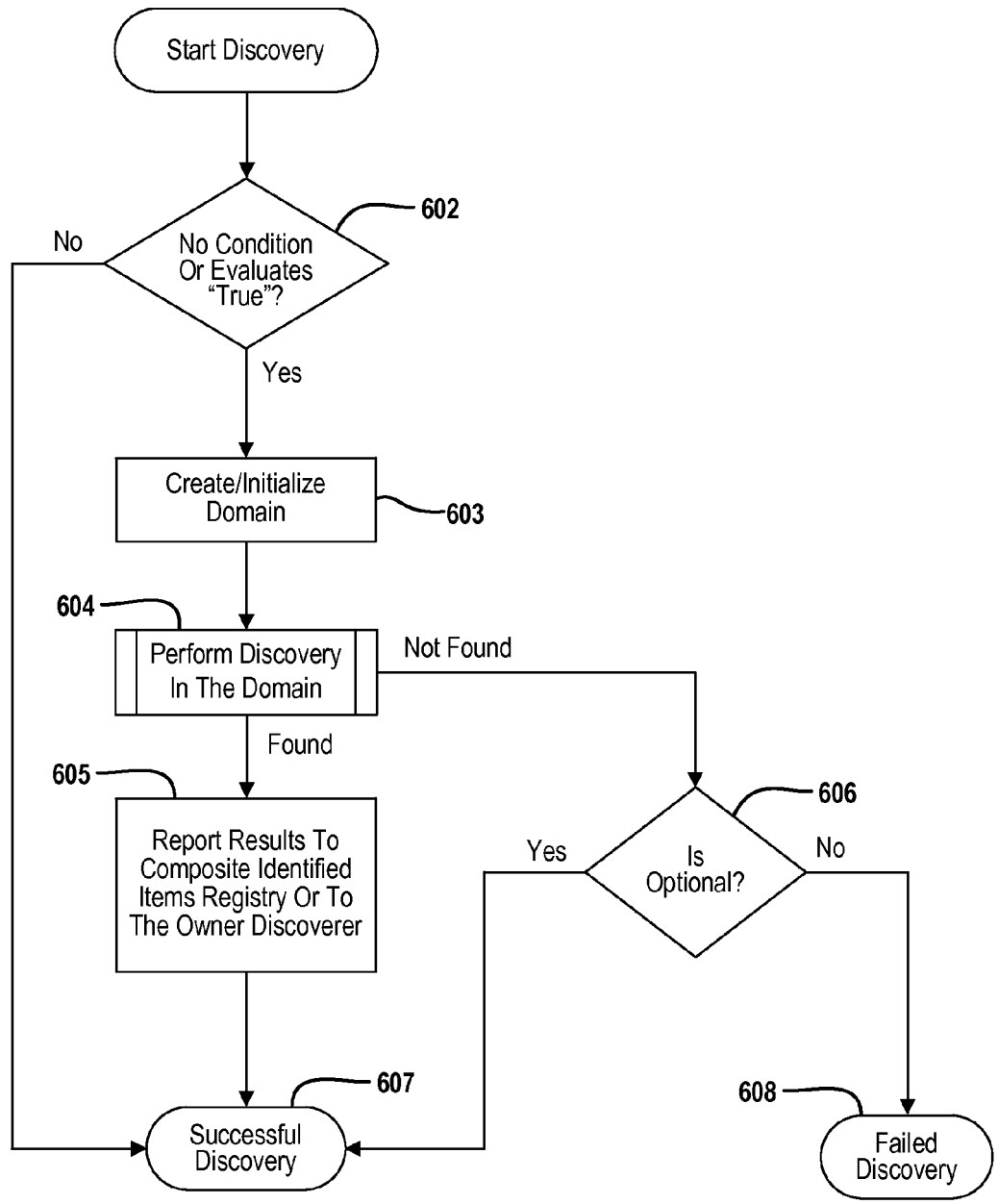
FIG. 6 is a flowchart depicting a discovery sub-process of the parsing stage of the identification method.

FIG. 6 depicts the discovery sub-process performed for each Discoverer. The discovery sub-process begins by evaluating any conditions associated with a given Discoverer. When the condition evaluates as 'False', the discovery sub-process ends returning a success indicator to the parsing process; otherwise, processing continues as indicated at 602.

The search domain is created and/or initialized at 603. For a Tenant Discoverer, it requests its Owner/Landlord Discoverer to create or initialize the Domain. For example, the Landlord Discoverer can use or adjust its own Domain based on the place of the Part Definitions of the Tenant Discoverer in the Composite Layout and on the state of its Discoverer Identified Parts Registry. For non-Tenant Discoverers, the Boundaries, the Composite Identified Parts Registry and Owner Discoverers' Identified Parts Registries are used to create a new Domain or reinitialize existing Domain. The 'Discovery in Domain' sub-process is then initiated at 604 on the Domain.

When the domain search is successful, report the Identified Parts to the Owner Discoverer, if one exists; otherwise, add them to the Composite Identified Parts Registry as indicated at 605. The Owner Discoverer can, for example, add the reported Identified Parts to its private Discoverer Identified Parts Registry. When the domain search fails or does not find any parts, check at 606 if the Discoverers are optional. For Optional Discoverers return a success indicator at 607; otherwise, return a failed indicator as indicated at 608.

Figure 7:
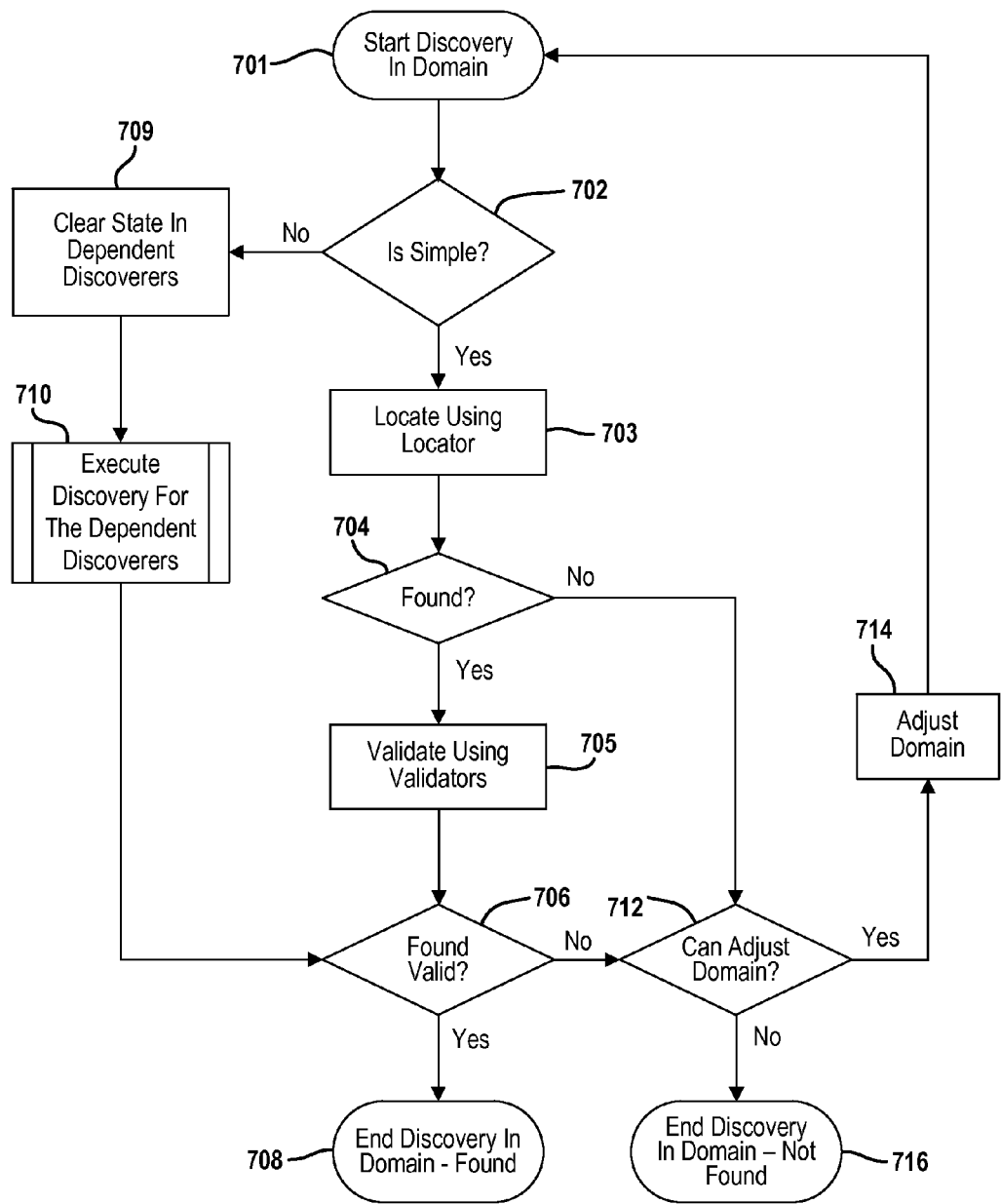
FIG. 7 is a flowchart depicting a discovery in a domain sub-process of the parsing stage of the identification method.

FIG. 7 depicts the Discovery in the Domain sub-process. First, the Discoverer is evaluated at 702 as being simple or not. For a Simple Discoverer, locate a matching data segment using the Locator prepared during Compilation as indicated at 703. For example, for a Locator by Regular Expression Pattern, the match can be found by using a Regular Expression parser; a Locator by Length can return the nearest in the specified Search Direction continuous data interval of given length, etc. If a matching data segment is found by the Locator, use the collection of Validators prepared during Compilation to validate the found data segment as indicated at 705.

For a Complex Discoverer, clear state in the dependent Discoverers, if needed, as indicated at 709. This state can include, for example, entries in the Discoverer Identified Parts Registry from the previous execution. The Discovery sub-process described above is executed for all of the dependent Discoverers as indicated at 710. For example, a complex Scan Discoverer can include three sequential simple discoverers, say Start Discoverer, Middle Discoverer and End Discoverer, which are identified in the left-to-right direction in the following order: Start Discoverer, End Discoverer, Middle Discoverer. At the time when Discovery in Domain process starts for the Scan Discoverer, its Domain could consist of several intervals, say 0 to 100 and 150 to 300. The step 710 will comprise of sequential execution of the Discovery sub-process for its child-discoverers. Each of these child discoverers can be either capable of determining its domain by itself, or (if it is marked as Tenant Discoverer) it can request the parent Scan Discoverer to provide it. In this example, if the Start Discoverer identified a matching data segment at the positions 20 to 25, and the following End Discoverer discovery is being executed, the step 603 can involve a request to the parent Scan Discoverer to define a Domain. Since the Scan Discoverer possesses the knowledge of the three parts being continuously chained together, it can define the End Discoverer's domain as a single interval from 26 to 100. If the corresponding data segment is identified, say at the positions 80 to 90, the execution of the Middle Discoverer is started and the Scan Discoverer can assign it the simple domain that extends between positions 26 and 79, and both ends of it would be 'pinned', as explained above.

The parent Complex Discoverer can also provide custom discovery logic aimed to serve a particular goal. For example, a Multiple Discoverer can contain a single child discoverer executed repeatedly by its parent. If a Multiple Discoverer also supports an additional data item that may separate occurrences of its primary data item, the Multiple Discoverer can be defined as a parent of a simple discoverer for the primary data item and of a complex discoverer that is looking for a sequence of the primary and additional data items, in which case the sub-processes 710 would be executed recursively.

After execution of all of the Child Discoverers, the Discoverer Identified Parts Registry would contain all of the identified parts if the execution was successful, or be empty if not.

In either case, a success indicator is returned at 708 for any newly found Identified Parts. If no newly Identified Parts has been found or an embedded Discovery sub-process has failed, a determination is made at 712 as to whether the Domain can be adjusted. For example, if a Scan Discoverer is searching for two connected required Composite Part Definitions in the Left-to-Right direction in the single-interval Domain that includes positions from 0 to 100, and the first match for the first Part Definition is found at the position 20, but the second Part Definition hasn't been matched, the Domain can be changed to start at the position 21 to exclude previously analyzed data ranges.

The Domain is adjusted at 714. For Tenant Discoverers, this task can be provided by the Landlord Owner Discoverer; otherwise this can be done by the current Discoverer. When adjusted, submit the adjusted Domain to the 'Discovery in Domain' sub-process and return its result. If the Domain cannot be adjusted, then the sub-process returns an indicator that no new Identified Parts were found.

Continuing with the full name example set forth above, the identification method is further described in relation to two example names: John O'Brien and Mrs. Anne-Louise Marie-Elise Andrea van der Varrt-Dyke, Sr., PH.D. Processing follows the Identification Order defined in above for the 'Full Name' Composite Data Definition.

Starting with John O'Brien, the identification method process as follows. Step 1: Locate 'Title' from the beginning of the full name by a delimiter, as specified in the Data Item definition. Since its Location Direction is Left-to-Right, this location is dependent on the identification of its right neighbor, 'Title Delimiter', which is located by Pattern defined as a regular expression matching any white space. Since the Location Direction of 'Title Delimiter' is also Left-to-Right, the 'Title Delimiter' is located as the first space from the left, which separates the words "John" and "O'Bryen" Since the 'Title Delimiter' item doesn't have any validators, this space is accepted as the 'Title Delimiter'. Location is returned to the title locator, which identifies now the interval from the start of the Full name to the identified delimiter as the 'Title', and the located title 'John' is passed to the only validator of the 'Title' data item, which tests it against the list of values defined for it. Since the list doesn't contain 'John' as a possible value, the validation fails. Since the 'Title' data item is defined as optional, inability to identify it is not treated as error. The identified value of 'Title Delimiter' is forgotten and ignored, and the first identification step is complete.

Step 2: Locate 'Title Delimiter'. Since location of the 'Title' data item was already performed and nothing was found, the 'Title Delimiter' data item must start at the beginning of the full name string. Since it's located by a pattern, the algorithm will identify all white space characters (e.g. spaces, tabs) in the beginning of the full name. Since these are not present and the pattern requires at least one white space, the location will fail. Since the 'Title Delimiter' data item is defined as optional, inability to identify it is not treated as error.

Step 3. Identification of the 'First Name' starts with its location by a delimiter. Since location direction is Left-to-Right, it will use its right neighbor in the layout ('First Name Delimiter') as a delimiter. Since 'First name' is also defined as a 'multiple' item with the 'First Name Splitter' separator (defined by a single value '-'), the location process will first try to identify the splitter, and since it is not found, the identification will return to location by the 'First Name Delimiter' delimiter. It will follow the same processing logic as described in the step 1, with the only difference that—when the space is identified as 'First Name Delimiter' and "John" is located as the 'First Name', the validation will use the first name pattern which will pass, so "John" would be accepted as the 'First Name'. Both of the newly found items 'First Name' and 'First Name Delimiter' can be held in the listing of identified data items ("Identified Parts Registry"), and the corresponding segments of the source Full Name are marked as already identified.

Step 4. Locate 'First Name Delimiter'. Since this item has been already processed and identified during the step 3, this step is skipped.

Step 5. Identification of the 'Suffix' starts with its location. Since it is defined to be located by a delimiter and its location direction is Right-to-Left, it will have to be preceded with location of the Suffix Delimiter. Similarly to step 3, since Suffix can have multiple occurrences separated by 'White Space with Optional Comma Separator', the algorithm will first try to locate the first white space or a comma optionally padded with white space, which will fail, and the identification will return to location by the 'Suffix Delimiter' delimiter. Since the 'Suffix delimiter' cannot be found in the remaining non-identified area, its location will fail, but since it is defined as an optional data item, the location of the Suffix will continue. Since the optional delimiter on the left cannot be identified, the process will use the left limit of the not identified area that joins the rightmost end of the Full Name as the delimiter, and therefore the location will return "O'Brien" as the Suffix. The located value of the Suffix is tested with the By-Value validator, which doesn't find a match in its listing of values, and therefore the located suffix is rejected and forgotten.

Step 6. The Suffix Delimiter is attempted to be identified, but similarly to step 2, it is not found.

Step 7. The 'Last Name' identification process will follow the logic of the step 5, but when the part "O'Brien" is located, it will be successfully validated by the 'Last Name' pattern validator. As result, "O'Brien" is identified as Last Name, added to listing of the identified items ("Identified Parts Registry"), and the corresponding interval of the Full Name data is marked as identified.

Step 8. The 'Last Name Delimiter' fails to be identified, since no non-identified area is remaining in the source data. Since this part is optional, it is not treated as error, and processing continues.

Step 9. The 'Last Name Prefix' fails to be identified, since no non-identified area is remaining in the source data. Since this part is optional, it is not treated as error, and processing continues.

Step 10. The 'Last Name Prefix Delimiter' fails to be identified, since no non-identified area is remaining in the source data. Since this part is optional, it is not treated as error, and processing continues.

Step 11. The 'Middle Name' fails to be identified, since no non-identified area is remaining in the source data. Since this part is optional, it is not treated as error, and processing continues.

Step 12. Validate that there is no non-identified area between any items that are connected in the layout. Since there is no any non-identified area, this validation succeeds.

Step 13. Check if any of the identified data items are marked as prefixes or suffixes, so they could be combined with its corresponding right and left neighbors. Since no prefixes or suffixes are defined in the steps 1-11, no changes are done during this step. This identification process yields the result of First name: "John", First Name Delimiter: " ", Last Name: "O'Brien".

The identification process is also applied to Mrs. Anne-Louise Marie-Elise Andrea van der Varrt-Dyke, Sr., PH.D. Identification logic is similar to the process described in the Sample 1, with the following differences.

Step 1: When 'Title' is located, it will identify the 'Title Delimiter' as the first space from the left, and the 'Title' as the substring "Mrs.". This time the By-Value validation succeeds, and the two identified parts are added to listing of the identified items ("Identified Parts Registry"), and the corresponding interval of the Full Name data is marked as identified.

Step 2: The Title Delimiter' identification is skipped, since it's already identified during the step 1.

Steps 3: The 'First Name' identification starts similarly to Sample 1 Step 3. When the process looks for the 'First Name Splitter', it identifies the "-" character after the word "Anne". It tests the substring "Anne" preceding the "-" separator for matching the First Name pattern, and since it passes, it accepts "Anne" as the First Name. Next the process is searching for the next occurrences of the "-" separator to the right, and finds the "-" character after the word "Marie". It tests the substring "Louise Marie" separated by it for matching the First Name pattern, which fails, since it doesn't allow spaces. Therefore the second "-" separator is dismissed and ignored, and the process returns to identification of the 'First Name' item by the delimiter. Since the 'First Name Delimiter' has location direction "Left-to-Right", the process searches for the next white space to the right from "Anne-", and it finds the space character after the word "Louise". The separated word "Louise" is tested with the 'By-Pattern' validator, which passes this time. Note: If the last validation would fail, the process would roll back the most recent occurrence of the 'First Name' and 'First Name Splitter' to the non-identified pool, and try identification by the delimiter once again. As result of this step, two occurrences of 'First Name' ("Anne" and "Louise") as well as the 'First Name Delimiter' (" ") and 'First Name Splitter' ("-") are added to the Identified Parts Registry.

Step 5. The Suffix identification will start similarly to Step 5 as described in relation to John O'Brien. When the process looks for the 'White Space with Optional Comma Separator', this time it finds the rightmost comma with the following space character. It tests the separated substring "Ph.D." with the "By-value" validator, and since it passes, it proceeds to the next iteration as follows. Starting from the just identified 'White Space with Optional Comma Separator', the process searches to the left for the next occurrence of the separator, and it finds the "," substring after the word "Dyke". It tests the separated substring "Sr." with the validator, which passes again. The next iteration will find the space character after the word "der" and the separated substring "Vaart-Dyke", which doesn't pass validation by value, and therefore scanning for the separator is completed, and the results of this iteration are rolled back. The process is searching now for the delimiter 'Suffix Delimiter'. Since it's defined exactly like the separator, it's processing will essentially repeat the last iteration by identifying the space character after the word "der" and the separated substring "Vaart-Dyke", which doesn't pass validation by value and therefore rejected. Since the delimiter is not found, the process proceeds with rolling back previously identified pairs of the 'Suffix' data item and the separator. First, it returns the "," and "Sr." substrings and marks their area as non-identified. The process looks again in the Right-to-Left direction for the 'Suffix Delimiter'. It finds the same "," substring (that follows the "Dyke" word) as the delimiter, and then validates the delimited substring "Sr." as the 'Suffix'. Since it passes the validation, all identified items (suffixes ("Sr." and "Ph.D."), Suffix Delimiter (",") and Suffix separator (",") are added to the Identified Parts Registry.

Step 7. The 'Last Name' identification process will follow the logic of step 7 as described in relation to John O'Brien. It will identify the substring "Vaart-Dyke" as the 'Last Name', and the preceding space as the 'Last Name Delimiter'

Step 8. The 'Last Name Delimiter' is skipped since it's already has been identified in the step 7.

Step 9. The 'Last Name Prefix' is identified similarly to the 'Suffix' from the Step 5. It locates the two instances: "van" and "der", as well as the two spaces—one as the Last Name Prefix separator and another as Last Name Prefix Delimiter.

Step 10. The 'Last Name Prefix Delimiter' is skipped since it's already has been identified in the step 9.

Step 11. The 'Middle Name' items are located 'by Layout', since by this time all neighboring data items have already been found, and therefore the 'Middle Name' is supposed to occupy the part of the Full Name string between the 'First Name Delimiter' and the 'Last Name Prefix Delimiter', which is the "Marie-Elise Andrea" substring. Since the 'Middle Name' item is defined as multiple, with the 'Middle Name Splitter' separating its multiple occurrences, and since the location direction is specified as Left-to-Right, the process is searching for the leftmost match to the 'Middle Name Splitter' within the non-identified area and finds the "-" separator after the word "Marie". The process tests the separated substring "Marie" on matching the pattern specified in its validator, which passes the test. The process searches for the next occurrence of the separator, and finds the space after the word "Elise". The word "Elise" also passes the By-Pattern validation. Since no more occurrences of the separator are found, the remaining substring "Andrea" is submitted to the validator. Since it passes too, the identification of the Middle Name is completed, and the identified items—three Middle Names ("Marie", "Elise", "Andrea") and two separators ("-" and " ") are added to the Identified Parts Registry.

Step 13. Since two of the identified items ('Last Name Prefix' instances) are specified as prefixes in the Composite Definition, they are included (with any connecting separator/delimiter items) into the following non-delimiting and non-prefix item, 'Last Name', changing it from "Vaart-Dyke" to "van der Vaart-Dyke". The identification process yields the result of Title: "Mrs.", Title Delimiter: " ", First Name: "Anne", First name Splitter: "-", First Name: "Louise", First Name Delimiter: " ", Middle Name: "Marie", Middle Name Splitter: "-", Middle Name: "Elise", Middle Name Splitter: " ", Middle Name: "Andrea", Last Name Prefix Delimiter: " ", Last Name: "van der Vaart-Dyke", Suffix Delimiter: ",", Suffix: "Sr.", Suffix Separator: ",", Suffix: "Ph.D.".

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

APPENDIX

| Data Item Definitions |
|---|
| 1. Data Item: 'Title'<br>Core attributes: List of values that contains: 'Mr.', 'Mrs.', 'Dr.', etc.; Case-insensitive<br>General Properties: optional<br>Identification Properties: Direction: Left-to-Right, Location method: 'By delimiter', validation methods: 'By Values' |
| 2. Data Item: 'White Space Separator' (Title Delimiter)<br>Core attributes: Separator, Delimiter, pattern defined by regular expression "\s+"<br>General Properties: optional<br>Identification Properties: Direction: Left-to-Right, Location method: 'By pattern', validation methods: None |
| 3. Data Item: 'First Name'<br>Core attributes: Regular expression pattern: "[\p{L}\']+(\.)?"<br>General Properties: required, can have multiple instances separated with 'First Name Splitter' item (a separator Data Item defined by a single value "-")<br>Identification Properties: Direction: Left-to-Right,<br>Location method: 'By delimiter', validation methods: 'By Pattern' |
| 4. Data Item: 'White Space Separator' (First Name Delimiter)<br>Core attributes: Separator, Delimiter, pattern defined by regular expression "\s+"<br>General Properties: optional |
| 5. Data Item: 'Middle Name'<br>Core attributes: Regular expression pattern: "[\p{L}\']+(\.)?"<br>General Properties: optional, can have multiple instances separated with 'Middle Name Splitter' item (a separator Data Item defined by a pattern "(-\|\s+)" )<br>Identification Properties: Direction: Left-to-Right, Location method: 'By Layout', validation methods: 'By Pattern' |
| 6. Data Item: 'White Space Separator' (Middle Name Delimiter)<br>Core attributes: Separator, Delimiter, pattern defined by regular expression "\s+"<br>General Properties: optional<br>Identification Properties: Direction: Left-to-Right, Location method: 'By pattern', validation methods: None |
| 7. Data Item: 'Last Name Prefix'<br>Core attributes: List of values that contains: 'Van', 'Der', 'Von', etc.; Case-insensitive<br>General Properties: prefix, optional, can have multiple instances separated with 'White Space Separator' (a separator Data Item defined by a regular expression pattern "\s+")<br>Identification Properties: Direction: Right-to-Left, Location method: 'By delimiter', validation methods: 'By Values' |
| 8. Data Item: 'White Space Separator' (Last Name Delimiter)<br>Core attributes: Separator, Delimiter, pattern defined by regular expression "\s+"<br>General Properties: optional<br>Identification Properties: Direction: Right-to-Left, Location method: 'By pattern', validation methods: None |
| 9. Data Item: 'Last Name'<br>Core attributes: Regular expression pattern: "[\p{L}-\']+(\.)?"<br>General Properties: optional, single<br>Identification Properties: Direction: Right-to-Left, Location method: 'By delimiter', validation methods: 'By Pattern' |
| 10. Data Item: 'White Space With Optional Comma Separator' (Suffix Delimiter) Core attributes: Separator, Delimiter, pattern defined by regular expression "\s+\|\s*, \s*"<br>General Properties: optional<br>Identification Properties: Direction: Right-to-Left, Location method: 'By pattern', validation methods: None |
| 11. Data Item: 'Suffix'<br>Core attributes: List of values that contains: 'Sr.', 'Jr.', 'Ph.D.', etc.; Case-insensitive<br>General Properties: optional, can have multiple instances separated with 'White Space with Optional Comma Separator' (a separator |

APPENDIX-continued

| Data Item Definitions |
|---|
| Data Item defined by a regular expression pattern "\s+\|\s*, \s*")<br>Identification Properties: Direction: Right-to-Left, Location method: 'By delimiter', validation methods: 'By Values' |

What is claimed is:

1. A computer-implemented method for defining a structure for items to be identified in loosely-structured data, comprising:
   defining a layout for a composite data definition, where the layout indicates at least one of positional relationship of data items to each other and positional information for data items in the loosely-structured data;
   arranging data items in the layout, where each data item in the layout has a common meaning for applications that use the data item;
   creating an identification order list for the composite data definition, where the identification order list includes the data items in the layout and specifies an order in which the data items comprising the composite data definition are to be identified within the loosely-structured data;
   receiving loosely-structured input data; and
   parsing the input data to identify data items therein using the layout and the identification order list of the composite data definition, where the data items in the layout are searched for in the order specified by the identification order list and the order specified in the identification order list differs from the arrangement of the data items in the layout of the composite data definition and the method is implemented by computer-executable instructions executed by a computer processor.

2. The method of claim 1 further comprises defining a set of core attributes which may be associated with data items, where the attributes are selected from a group comprised of length of data item, minimum length of data item, maximum length of data item, list of values for the data item, pattern of characters which comprise a data item, case-sensitivity of characters which comprise a data item and a reference to a layout.

3. The method of claim 1 further comprises assigning an identification property to a given data item in the layout after the given data item has been arranged in the layout.

4. The method of claim 2 further comprises assigning a search direction in a search domain for a given data item in the layout, where the search direction is assigned in accordance with placement of the given data item in the layout.

5. The method of claim 2 further comprises specifying a given data item in the layout as being an optional part of the composite data definition.

6. The method of claim 2 further comprises assigning a location method to a given data item in the layout, where the location method specifies a method by which to locate the given data item in the input data.

7. The method of claim 2 further comprises assigning a validation method for a given data item in the layout, where the validation method specifies a method by which to validate a value of the given data item during parsing.

8. The method of claim 2 further comprises specifying a given data item in the layout as being either a prefix or a suffix such that data identified as the given data item is associated with a data item that follows or precedes the given data item, respectively.

9. The method of claim 2 further comprises specifying a logical condition for a given data item, where the logical condition specifies a condition by which to identify the given data item during parsing.

10. The method of claim 1 further comprises:
receiving a composite data definition comprised of two or more data items and at least one dependency between the two or more data items, where each data item has a common meaning for applications that use the data item;
assigning a discoverer to each data item associated with the composite data definition, where a discoverer for a given data item is comprised of a group of steps for identifying the given data item in the loosely-structured data;
identifying a dependency between the two or more data items associated with the composite data definition;
assigning a discoverer to the identified dependency, where a discoverer for a given dependency is comprised of a group of steps for identifying the dependency of data items in the loosely-structured data;
iteratively performing the steps of identifying a dependency and assigning a discoverer to the identified dependency for all of the dependencies associated with the composite data definition;
receiving input data; and
parsing the input data to identify data items by executing discoverers associated with the composite data definition, where the parsing is implemented by computer-executable instructions executed by a computer processor.

11. The method of claim 10 further comprises
identifying a dependency between two assigned discoverers;
assigning a complex discoverer to the identified dependency between the two assigned discoverers.

12. The method of claim 10 wherein the discoverer for a given data item operates to determine a search domain for the given data item in the input data, tracks whether the given data item is found in the input data, and reports an outcome of the discoverer to another discoverer having an ancestral relationship therewith.

13. The method of claim 12 wherein the discover reports the outcome to the another discoverer when the given data item is successfully identified.

14. The method of claim 10 further comprises constructing the collection of preconfigured discoverers, where the collection of preconfigured discoverers includes a discoverer that identifies all data item belonging to a scan layout, a discoverer that identifies a data item based on one or more delimiters, a discoverer that identifies a data item that contains multiple occurrences and a discoverer that identifies a data item associated with a complex layout.

15. The method of claim 10 further comprises
constructing a given location method which functions to locate a given data item;
associating the given location method with the discoverer for the given data item, where the given location method is associated based on an attribute assigned to the given data item.

16. The method of claim 10 further comprises
constructing a given validation method which functions to validate a given data item; and
associating the given validation method with the discoverer for the given data item, where the given validation method is associated based on an attribute assigned to the given data item.

17. The method of claim 10 wherein parsing the input data further comprises executing discoverers in accordance with an identification order list associated with the composite data definition, where the identification order list specifies an order in which the data items comprising the composite data definition are to be identified in the input data.

18. A computer-implemented method for defining a structure for items to be identified in loosely-structured data, comprising:
assigning a name to a composite data definition using a visual editor, where the visual editor is implemented by computer-executable instructions executed by a computer processor;
selecting, via the visual editor, a first data item from a listing of data items, where the first data item has a common meaning for applications that use the first data item and includes one or more properties associated therewith;
arranging, via the visual editor, the first data item in a layout for the composite data definition;
creating an identification order list for the composite data definition, where the identification order list includes the first data item and specifies an order in which data items comprising the composite data definition are to be identified within the loosely-structured data;
selecting, via the visual editor, a second data item from the listing of data items;
arranging, via the visual editor, the second data item in relation to the first data item within the layout;
adding the second data item to the identification order list, where the order of the data items in the identification order list is in accordance with the arrangement of the first data time in relation to the second data item in the layout;
receiving input data; and
parsing the input data to identify items therein using the layout and the identification order list of the composite data definition, where the data items in the layout are searched for in the order specified by the identification order list and the order specified in the identification order list differs from the arrangement of the data items in the layout of the composite data definition.

19. The method of claim 18 further comprises assigning a search direction for the first data item in a search domain, where the search direction is assigned in accordance with placement of the first data item in the layout.

20. The method of claim 18 further comprises defining a set of core attributes which may be associated with data items, where the attributes are selected from a group comprised of length of data item, minimum length of data item, maximum length of data item, list of values for the data item, pattern of characters which comprise a data item, case-sensitivity of characters which comprise a data item and a reference to a layout.

21. The method of claim 18 further comprises assigning an identification property to a given data item in the layout after the given data item has been arranged in the layout.

22. The method of claim 21 further comprises assigning a search direction in a search domain for a given data item in the layout, where the search direction is assigned in accordance with placement of the given data item in the layout.

23. The method of claim 21 further comprises specifying a given data item in the layout as being an optional part of the composite data definition.

24. The method of claim 21 further comprises specifying a given data item in the layout as having multiple occurrences in the input data.

25. The method of claim 21 further comprises assigning a location method to a given data item in the layout, where the location method specifies a method by which to locate the given data item in the input data.

26. The method of claim 21 further comprises assigning a validation method for a given data item in the layout, where the validation method specifies a method by which to validate a value of the given data item during parsing.

27. The method of claim 21 further comprises specifying a given data item in the layout as being either a prefix or a suffix such that data identified as the given data item is associated with a data item that follows or precedes the given data item, respectively.

28. The method of claim 21 further comprises specifying a logical condition for a given data item, where the logical condition specifies a condition by which to identify the given data item during parsing.

* * * * *